United States Patent
Kimoto et al.

(10) Patent No.: US 12,298,432 B2
(45) Date of Patent: May 13, 2025

(54) DETECTION DEVICE CALIBRATION METHOD

(71) Applicant: KAWASAKI MOTORS, LTD., Akashi (JP)

(72) Inventors: Takashi Kimoto, Akashi (JP); Hiroaki Amano, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 371 days.

(21) Appl. No.: 17/961,037

(22) Filed: Oct. 6, 2022

(65) Prior Publication Data

US 2023/0114384 A1 Apr. 13, 2023

(30) Foreign Application Priority Data

Oct. 8, 2021 (JP) .................. 2021-166190

(51) Int. Cl.
*G01S 7/40* (2006.01)
*G01S 13/931* (2020.01)

(52) U.S. Cl.
CPC .............. *G01S 7/40* (2013.01); *G01S 13/931* (2013.01)

(58) Field of Classification Search
CPC ........ G01S 7/40; G01S 7/4008; G01S 7/4021; G01S 7/4026; G01S 7/403; G01S 7/4034; G01S 7/4082; G01S 13/931
See application file for complete search history.

(56) References Cited

U.S. PATENT DOCUMENTS

| 5,495,254 A * | 2/1996 | Uemura | G01S 13/931 |
| | | | 342/174 |
| 6,418,775 B1 * | 7/2002 | Sager | G01S 7/4972 |
| | | | 73/1.79 |
| 6,498,959 B1 * | 12/2002 | January | G01B 11/275 |
| | | | 356/138 |
| 7,650,239 B2 * | 1/2010 | Samukawa | G01S 17/931 |
| | | | 356/28 |
| 9,645,051 B2 * | 5/2017 | Jin | G01M 17/007 |
| 10,323,936 B2 * | 6/2019 | Leikert | G01B 11/2755 |
| 10,473,759 B2 * | 11/2019 | Bilik | G01S 13/46 |
| 10,921,426 B2 * | 2/2021 | Tang | G01S 7/4017 |

(Continued)

FOREIGN PATENT DOCUMENTS

JP 2021-095060 A 6/2021

*Primary Examiner* — Peter M Bythrow
(74) *Attorney, Agent, or Firm* — PROCOPIO, CORY, HARGREAVES & SAVITCH LLP

(57) ABSTRACT

There is provided a detection device calibration method including: attaching a first reflector to a side surface of a vehicle such that a reflection surface of the first reflector is perpendicular to a vehicle width direction; adjusting a direction of a laser marker such that a first laser beam of the laser marker is emitted perpendicularly to the reflection surface of the first reflector; adjusting a direction of a second reflector disposed in front of or behind the vehicle such that a second laser beam of the laser marker is emitted perpendicularly to a reflection surface of the second reflector, the second laser beam being emitted in a vehicle length direction; emitting a detection wave from a detection device provided in the vehicle to the second reflector; and calibrating a transmission direction of the detection wave based on a detection result of a reflected wave.

8 Claims, 3 Drawing Sheets

(56) References Cited

U.S. PATENT DOCUMENTS

| | | | | |
|---|---|---|---|---|
| 2004/0165174 | A1* | 8/2004 | Knoedler | G01M 11/067 |
| | | | | 340/992 |
| 2010/0186244 | A1* | 7/2010 | Schwindt | G01S 13/931 |
| | | | | 33/288 |
| 2013/0110314 | A1* | 5/2013 | Stieff | G01B 11/275 |
| | | | | 701/1 |
| 2013/0325252 | A1* | 12/2013 | Schommer | G01S 7/52004 |
| | | | | 701/33.1 |
| 2015/0134191 | A1* | 5/2015 | Kim | G01M 17/007 |
| | | | | 701/29.7 |
| 2018/0052223 | A1* | 2/2018 | Stieff | G01S 7/4026 |
| 2019/0187249 | A1* | 6/2019 | Harmer | G01S 7/40 |
| 2020/0096607 | A1* | 3/2020 | Okubo | G01B 11/2755 |
| 2020/0150224 | A1* | 5/2020 | Cejka | G01S 13/931 |
| 2020/0284887 | A1* | 9/2020 | Wachter | G01S 13/867 |
| 2020/0355792 | A1* | 11/2020 | Tang | G01S 7/4021 |
| 2021/0188384 | A1* | 6/2021 | Saeki | B62J 11/00 |
| 2022/0094070 | A1* | 3/2022 | Harle | G01S 13/345 |
| 2022/0324528 | A1* | 10/2022 | Ikeda | B62J 6/027 |
| 2023/0194662 | A1* | 6/2023 | Moss | G01S 7/4008 |
| | | | | 342/165 |

* cited by examiner

DETECTION DEVICE CALIBRATION METHOD

CROSS-REFERENCE TO RELATED APPLICATIONS

This application is based on and claims priority under 35 USC 119 from Japanese Patent Application No. 2021-166190 filed on Oct. 8, 2021, the contents of which are incorporated herein by reference.

TECHNICAL FIELD

The present application mainly relates to a detection device calibration method for calibrating a transmission direction of a detection wave by a detection device provided in a vehicle.

BACKGROUND ART

JP2021-095060A discloses a vehicle provided with a radar device (detection device). The radar device includes a main body that transmits and receives an electromagnetic wave, and a direction adjustment mechanism.

A direction of the radar device can be adjusted by operating the direction adjustment mechanism. Accordingly, a transmission direction of the electromagnetic wave can be calibrated.

A detection device such as a radar device or a sonar transmits a transmission wave and detects a reflected wave obtained by reflecting the transmission wave by an object. In order to perform calibration with this kind of detection device, it is necessary to provide a calibration reflector that reflects the transmission wave in an accurate direction with respect to the vehicle. Unfortunately, it is not easy to dispose the reflector in an accurate direction with respect to the vehicle, and it takes time and effort.

SUMMARY OF INVENTION

The present disclosure provides a detection device calibration method which can calibrate a transmission direction of a detection wave of a detection device provided in a vehicle by arranging a reflector for calibrating the detection device in an accurate direction with respect to the vehicle by a simple method.

According to an illustrative aspect of the present disclosure, a detection device calibration method includes: attaching a first reflector to at least one surface of side surfaces of a vehicle such that a reflection surface of the first reflector is perpendicular to a vehicle width direction; adjusting a direction of a laser marker such that a first laser beam emitted by the laser marker is emitted perpendicularly to the reflection surface of the first reflector; adjusting a direction of a second reflector disposed in front of or behind the vehicle such that a second laser beam emitted by the laser marker is emitted perpendicularly to a reflection surface of the second reflector, the second laser beam being emitted perpendicularly to the first laser beam in a vehicle length direction; emitting a detection wave from a detection device provided in the vehicle to the second reflector; and calibrating a transmission direction of the detection wave based on a detection result of a reflected wave.

According to the present application, it is possible to calibrate the transmission direction of the detection wave of the detection device by arranging the reflector in an accurate direction with respect to the vehicle by a simple method.

DESCRIPTION OF EMBODIMENTS

Figure 1:
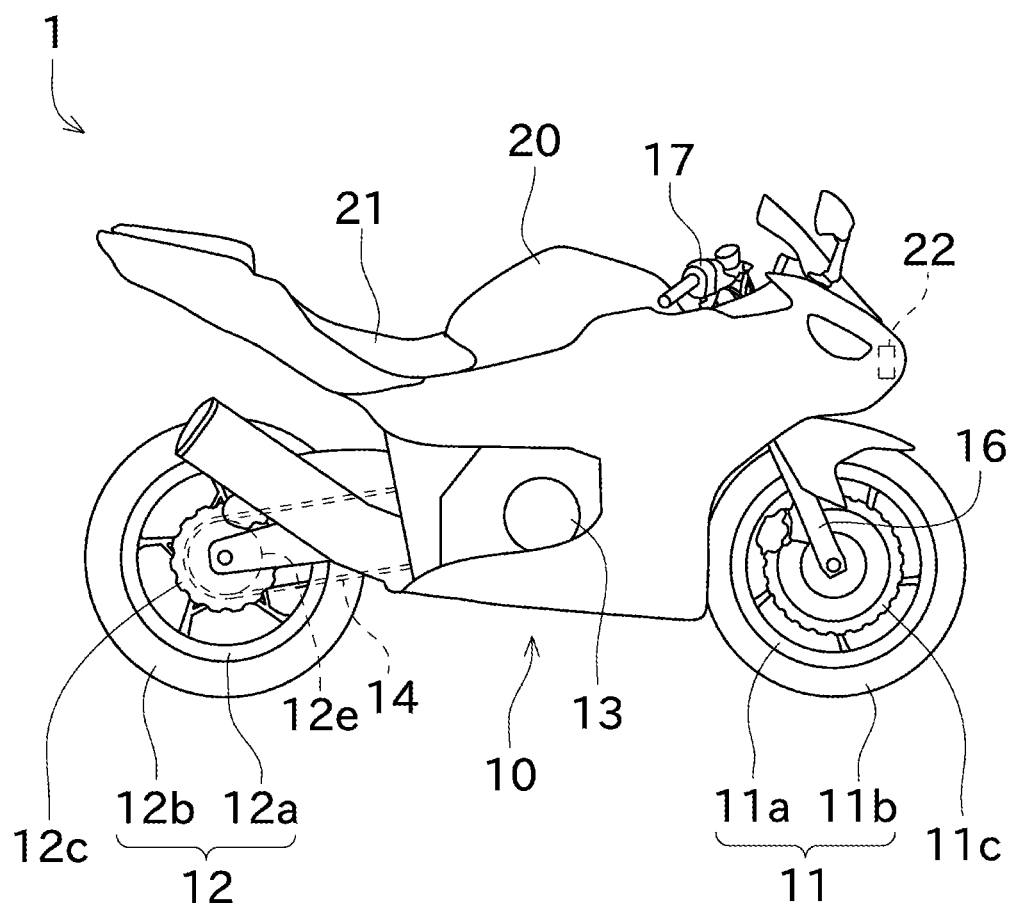
FIG. 1 is a side view of a motorcycle to be subjected to a detection device calibration method.

Next, a detection device calibration method according to the present application will be described with reference to the drawings. First, a motorcycle 1 to be subjected to the detection device calibration method will be briefly described with reference to FIG. 1. FIG. 1 is a side view of the motorcycle 1.

In the following description, a direction viewed from a driver riding the motorcycle 1 is defined as a left-right direction of the motorcycle 1. Therefore, a front-rear direction coincides with a vehicle length direction, and the left-right direction coincides with a vehicle width direction. In addition, a vertical direction and an up-down direction coincide with a height direction. As shown in FIG. 1, the motorcycle 1 includes a vehicle body 10, a front wheel 11, and a rear wheel 12.

The vehicle body 10 includes a plurality of vehicle body frames serving as a framework of the motorcycle 1. Various components configuring the motorcycle 1 are attached to the vehicle body frames. An engine 13 is provided in the vicinity of the center of the vehicle body 10 in the vehicle length direction. The engine 13 is a drive source for driving the motorcycle 1. The engine 13 according to the present embodiment is a gasoline engine. Instead of or in addition to the gasoline engine, another drive source, for example, an electric motor for traveling may be provided. Power generated by the engine 13 is transmitted to the rear wheel 12 via a drive chain 14. Accordingly, the motorcycle 1 can be caused to travel.

The front wheel 11 includes a front rim 11a and a front tire 11b. The front rim 11a is rotatably attached to the vehicle body 10 via an axle. The front tire 11b is attached to the front rim 11a. A front brake disc 11c is further attached to the front rim 11a. The front brake disc 11c rotates integrally with the front rim 11a. A brake pad of a brake caliper is pressed against the front brake disc 11c by an operation of the driver, whereby a braking force is generated.

The rear wheel 12 includes a rear rim 12a and a rear tire 12b. The rear rim 12a is rotatably attached to the vehicle body 10 via an axle. The rear tire 12b is attached to the rear rim 12a. A rear brake disc 12c and a sprocket 12e are further attached to the rear rim 12a. The rear brake disc 12c rotates integrally with the rear rim 12a. A brake pad of a brake caliper is pressed against the rear brake disc 12c by an operation of the driver, whereby a braking force is generated.

The sprocket 12e transmits the transmitted driving force to the rear rim 12a via the drive chain 14. The drive chain 14 is disposed on one side in the vehicle width direction with respect to the rear brake disc 12c. More specifically, the drive chain 14 is disposed on one side with respect to the center in the vehicle width direction. In addition, the rear brake disc 12c is disposed on the other side with respect to the center in the vehicle width direction. In the present embodiment, one side corresponds to a left side, and the other side corresponds to a right side. The rear brake disc 12c and the sprocket 12e may be collectively disposed on the one side or the other side with respect to the center in the vehicle width direction.

Front forks 16 are attached to the vehicle body frames. A pair of the left and right front forks 16 are disposed so as to sandwich the front wheel 11 in a front view. A steering handle 17 is disposed in the vicinity of upper ends of the front forks 16. Since the front forks 16 and the front wheel 11 are rotated by the driver rotating the steering handle 17, a traveling direction can be changed by pivoting the motorcycle 1. That is, the front wheel 11 is a steered wheel. In addition, the motorcycle 1 is a lean-type vehicle in which the vehicle body 10 is inclined toward a pivoting center side with respect to a road surface during pivoting.

A fuel tank 20 in which fuel to be supplied to the engine 13 is stored is disposed behind the steering handle 17 and above the engine 13. A seat 21 on which the driver sits is disposed behind the fuel tank 20. A step is disposed on each of a left side surface and a right side surface of the vehicle body 10. The driver places his/her feet on the left and right steps across the seat 21. In this way, since the driver straddles the seat 21, the motorcycle 1 is a straddle-type vehicle.

A radar device 22 for detecting the front is disposed at a front end of the motorcycle 1 or in the vicinity of the front end. The radar device 22 detects a direction in which an object exists and a distance to the object by transmitting a detection wave to the front and acquiring a reflected wave reflected by the object. The detection wave transmitted by the radar device 22 is an electromagnetic wave, specifically, an infrared ray, a millimeter wave, or a microwave. The motorcycle 1 notifies the driver of information related to the detected object based on a detection result of the radar device 22, and actuates a brake to assist prevention of a collision with the object. In addition, the radar device 22 includes an adjustment mechanism that adjusts a transmission direction of the detection wave in the height direction and a transmission direction of the detection wave in the vehicle width direction. Alternatively, the adjustment mechanism may be capable of adjusting only one of the height direction and the vehicle width direction.

Figure 3:
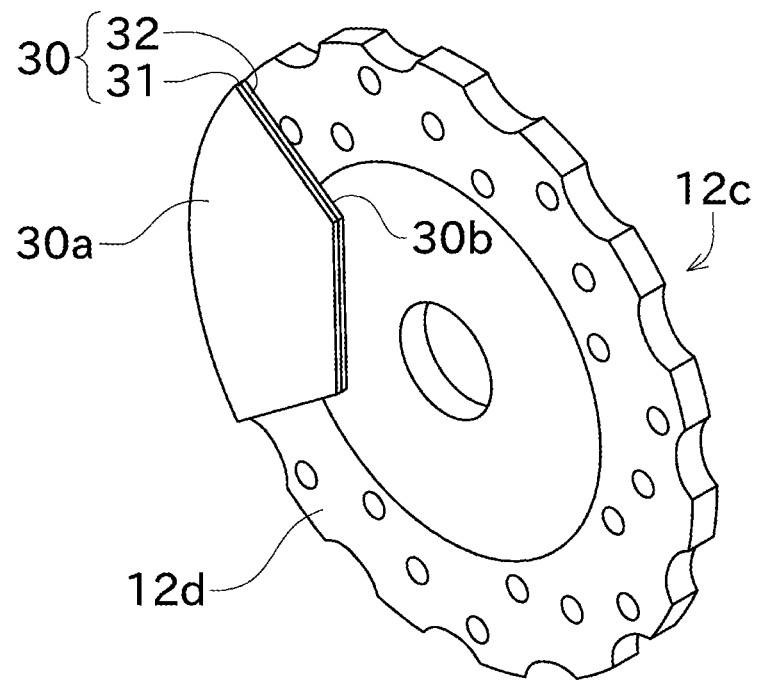
FIG. 3 is a perspective view of a state in which a first reflector according to the present embodiment is attached to a rear brake disc.
Figure 4:
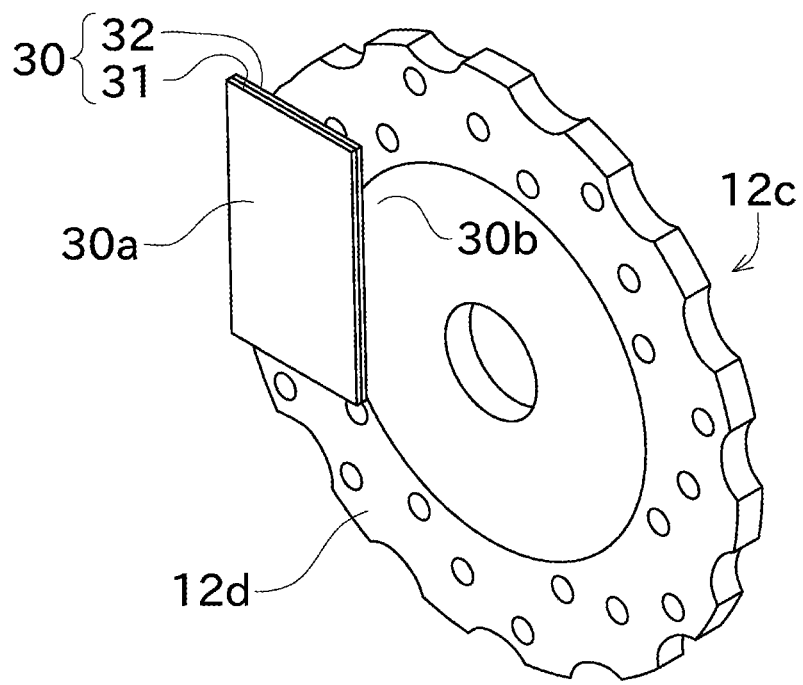
FIG. 4 is a perspective view of a state in which a first reflector according to another example is attached to the rear brake disc.

Next, the detection device calibration method for calibrating the transmission direction of the detection wave of the radar device 22 will be described with reference to FIGS. 2 to 4.

Figure 2:
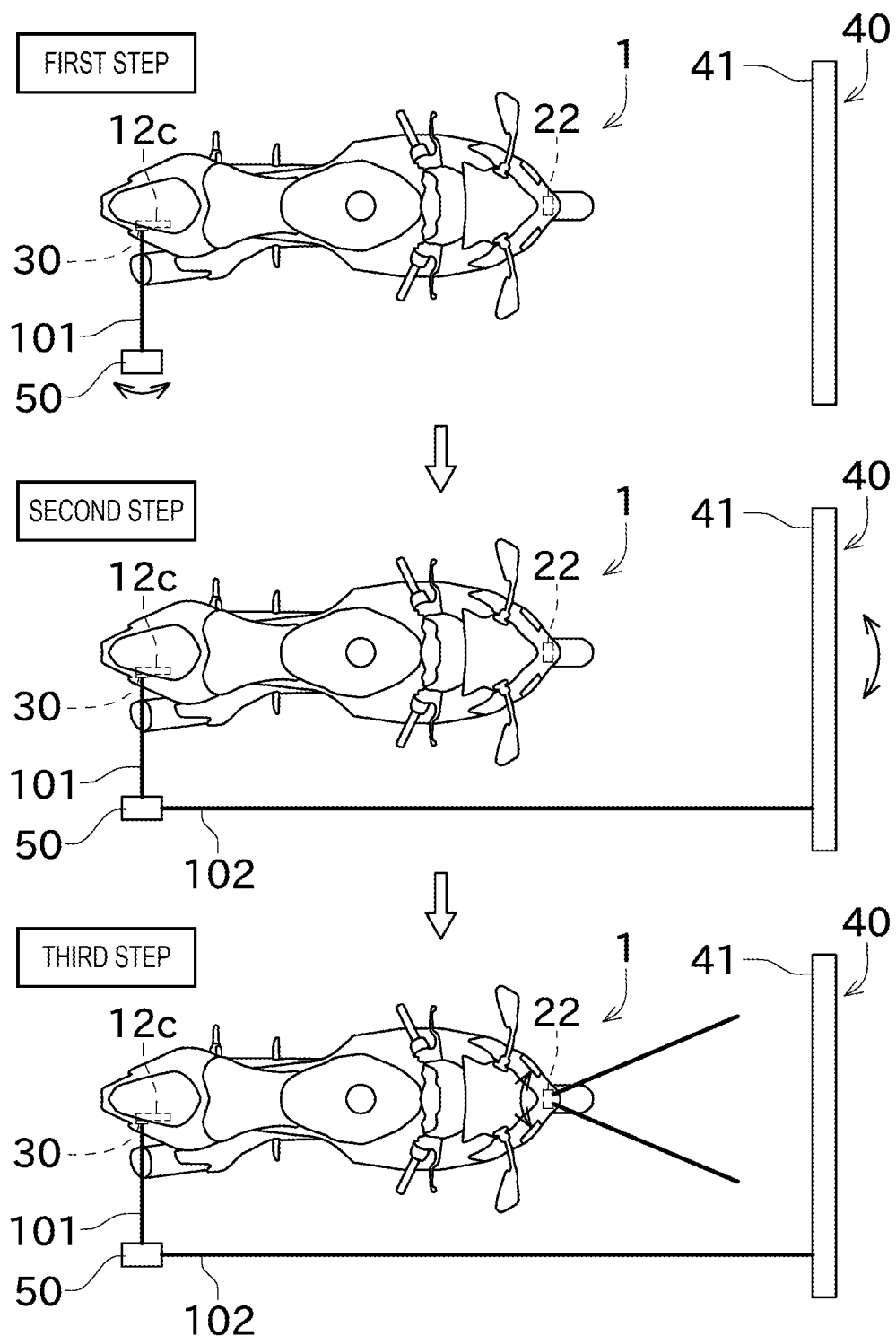
FIG. 2 is a diagram showing a flow of the detection device calibration method.

Hereinafter, as shown in FIG. 2, the detection device calibration method will be described by dividing the method into a first step to a third step. Before performing the first step, a first reflector 30, a second reflector 40, and a laser marker 50 are prepared. Alternatively, the second reflector 40 may be prepared after the first step is performed.

The first reflector 30 is a member that is attached to the motorcycle 1 and performs direction adjustment using a laser beam. As shown in FIG. 3, the first reflector 30 is a plate-shaped member, one surface is a reflection surface 30a, and a surface on an opposite side thereof is a back surface 30b. The reflection surface 30a is, for example, a mirror surface, and can reflect the laser beam almost without scattering the laser beam. The first reflector 30 is attached to the vehicle body 10 such that the back surface 30b and a side surface of the motorcycle 1 are in contact with each other.

Here, the first reflector 30 may be attached to the vehicle body 10 while or after the back surface 30b and a side surface of the motorcycle 1 are in contact with each other, for example. The side surface of the motorcycle 1 is, for example, a surface that can be visually recognized in a side view. In the present embodiment, the first reflector 30 is attached to an attachment surface 12d of the rear brake disc 12c. As it will be described later, the first reflector 30 may be attached a member other than the rear brake disc 12c.

The first reflector 30 has a fan shape and has an arc-shaped contour along a contour of the rear brake disc 12c. Alternatively, this shape is an example, and may be a rectangular shape as shown in FIG. 4. In addition, the entire first reflector 30 may overlap the rear brake disc 12c in the side view. In this case, the first reflector 30 and the rear brake disc 12c can be firmly connected. On the other hand, a part of the first reflector 30 may protrude from the rear brake disc 12c in the side view. In this case, since the first reflector 30 can be located in a wide range, the first step to be described later may be facilitated. The shape of the first reflector 30 is not limited to a plate shape, and may be a block shape.

The first reflector 30 includes a reflection member 31 and a magnet 32. The reflection member 31 and the magnet 32 are fixed by an adhesive, a tape, or the like. The reflection member 31 has a flat plate shape and includes the reflection surface 30a. The magnet 32 is fixed to a surface opposite to the reflection surface 30a.

The second reflector 40 is a member for reflecting the detection wave transmitted by the radar device 22. The second reflector 40 includes a reflection surface 41 that can reflect the laser beam almost without scattering the laser beam. The second reflector 40 is disposed in a direction in which the radar device 22 transmits the detection wave. In the present embodiment, the second reflector 40 is disposed in front of the radar device 22. The radar device 22 can detect a relative direction of the radar device 22 with respect to the second reflector 40 by receiving and analyzing the reflected wave reflected by the second reflector 40. Alternatively, when a radar device for detecting the rear of the motorcycle 1 is provided and the radar device is calibrated, the second reflector 40 is disposed behind the motorcycle 1.

The laser marker 50 can emit laser beams in two directions orthogonal to each other in a horizontal plane. The laser marker 50 emits a first laser beam 101 in a direction parallel to the vehicle width direction, and emits a second laser beam 102 in a direction parallel to the vehicle length direction. The laser marker 50 is used to adjust a positional relation such that the motorcycle 1 faces the second reflector 40.

In the first step, firstly, the first reflector 30 is attached to the rear brake disc 12c. Since the rear brake disc 12c is a magnetic body, the first reflector 30 can be fixed to the rear brake disc 12c by a magnetic force of the magnet 32 of the first reflector 30. In addition, the attachment surface 12d of the rear brake disk 12c is a surface perpendicular to the vehicle width direction. Further, the attachment surface 12d, the reflection surface 30a, and the back surface 30b are all parallel surfaces. As described above, only by attaching the first reflector 30 to the rear brake disc 12c, the reflection surface 30a becomes a surface perpendicular to the vehicle width direction.

The first reflector 30 is removed after the third step is completed. In the present embodiment, since the first reflector 30 is attached to the rear brake disc 12c by the magnetic force, it is easy to attach and detach the first reflector 30.

Alternatively, the first reflector 30 may be attached to the rear brake disc 12c by another detachable method such as a tape or a bolt.

In the first step, a direction of the laser marker 50 is adjusted such that the first laser beam 101 is perpendicularly emitted on the first reflector 30. Specifically, the direction of the laser marker 50 is adjusted such that a position of the first laser beam 101 traveling from the laser marker 50 toward the first reflector 30 and a position of the first laser beam 101 reflected by the first reflector 30 and traveling toward the laser marker 50 coincide with each other. Accordingly, the first laser beam 101 is emitted in parallel with the vehicle width direction.

Next, in the second step, the second laser beam 102 is emitted from the laser marker 50. Then, a direction of the second reflector 40 is adjusted such that the second laser beam 102 is emitted perpendicularly to the reflection surface 41 of the second reflector 40. Specifically, the direction of the laser marker 50 is adjusted such that a position of the second laser beam 102 traveling from the laser marker 50 toward the second reflector 40 and a position of the second laser beam 102 reflected by the second reflector 40 and traveling toward the laser marker 50 coincide with each other.

Since the first laser beam 101 and the second laser beam 102 are substantially accurately orthogonal to each other, the second laser beam 102 is parallel to the vehicle length direction. Therefore, when the second step is completed, the motorcycle 1 and the second reflector 40 face each other. In other words, the vehicle length direction of the motorcycle 1 is perpendicular to the reflection surface 41 of the second reflector 40.

Next, in the third step, the transmission direction of the detection wave is calibrated while the detection wave is transmitted from the radar device 22. Specifically, the radar device 22 is set to an adjustment mode, and the detection wave is transmitted from the radar device 22. The radar device 22 receives the reflected wave of the detection wave reflected by the second reflector 40. The radar device 22 detects the relative direction of the radar device 22 with respect to the second reflector 40 based on the received reflected wave. An operator of a calibration operation repeats transmission and reception of the detection wave while operating the adjustment mechanism of the radar device 22, and completes the calibration operation at a timing at which the radar device 22 faces the second reflector 40.

As described above, since the vehicle length direction of the motorcycle 1 is perpendicular to the reflection surface 41 of the second reflector 40 at the time when the second step is completed, the transmission direction of the detection wave of the radar device 22 becomes appropriate by causing the radar device 22 to face the second reflector 40.

In the detection device calibration method according to the present embodiment, the preparation of the first reflector 30 is completed only by attaching the first reflector 30 to the rear brake disk 12c in the first step. Therefore, the operation is simpler than a method in which a jig or the like is attached to the motorcycle 1 and a reflector is attached to the jig. Further, since the direction of the laser marker 50 is adjusted in the first step and the direction of the second reflector 40 is adjusted in the second step, it is not necessary to change the direction of the motorcycle 1 having a large weight. Therefore, the operation is simpler than a method including a step of adjusting the direction of the motorcycle 1.

Next, advantages of attaching the first reflector 30 to the rear brake disc 12c and other attachment locations will be described.

In order to perform the calibration of the radar device 22 with high accuracy, it is necessary to perform the adjustment in each of the first step, the second step, and the third step with high accuracy. For example, when the direction of the reflection surface 30a of the first reflector 30 is greatly deviated from a direction perpendicular to the vehicle width direction, the first step cannot be performed with high accuracy. In this regard, since the front wheel 11 and the rear wheel 12 are members directly related to the direction in which the motorcycle 1 travels, the front wheel 11 and the rear wheel 12 generally have high direction accuracy. In particular, since the rear wheel 12 is not a steered wheel, the direction of the rear wheel 12 cannot change. That is, a side surface of the rear wheel 12 is accurately perpendicular to the vehicle width direction.

As described above, by attaching the first reflector 30 to the rear wheel 12 or a member supported by the rear wheel 12, it is possible to increase the direction accuracy of the first reflector 30. The rear brake disk 12c is a member that is supported by the rear wheel 12 and whose direction with respect to the rear wheel 12 is fixed, and thus is preferable. Further, since the attachment surface 12d of the rear brake disk 12c is a surface perpendicular to the vehicle width direction, a jig or the like for adjusting an attachment direction is not necessary. Further, since it is assumed that the rear brake disc 12c presses the brake pad, a surface of the rear brake disc 12c has high flatness.

Instead of the rear brake disc 12c, the first reflector 30 may be attached to the sprocket 12e, a chain guide that guides the drive chain 14, or the rear rim 12a. When the first reflector 30 is attached to the rear rim 12a, the first reflector 30 is preferably attached to a hub to which the rear brake disc 12c is attached.

In the present embodiment, the first reflector 30 is attached to the rear brake disk 12c, which is a member whose direction does not change during steering. Alternatively, the first reflector 30 may be attached to a member whose direction changes during steering. For example, the first reflector 30 may be attached to the front wheel 11 or a member supported by the front wheel instead of the rear wheel 12. In this case, it is necessary to fix the front wheel 11 such that a steering angle of the front wheel 11 does not change. The first reflector 30 may be attached to, for example, the front brake disc 11c or the front rim 11a. Alternatively, when a vehicle speed sensor including a rotor that rotates integrally with the front rim 11a and a sensor that detects rotation of the rotor is provided, the first reflector 30 may be attached to the rotor.

In the present embodiment, the first reflector 30 is directly attached to the motorcycle 1. Alternatively, the first reflector 30 may be attached to the motorcycle 1 via another member. For example, when the first reflector 30 is attached to an attachment surface inclined at angle θ° with respect to a plane perpendicular to the vehicle width direction, the first reflector 30 may be attached via a jig inclined at angle θ° in an opposite direction.

The first reflector 30 may be attached to a member other than the front wheel 11 and the rear wheel 12. For example, the first reflector 30 may be attached to the vehicle body frame or the engine 13. In this case, the direction of the attachment surface is also preferably perpendicular to the vehicle width direction. Alternatively, the direction of the attachment surface may not be perpendicular to the vehicle width direction.

As described above, in the detection device calibration method according to the present embodiment, the first reflector 30 is attached to the side surface of the motorcycle 1 such that the reflection surface 30a of the first reflector 30 is perpendicular to the vehicle width direction. The direction of the laser marker 50 is adjusted such that the first laser beam 101 emitted by the laser marker 50 is emitted perpendicularly to the reflection surface 30a of the first reflector 30. The direction of the second reflector 40 is adjusted such that the second laser beam 102 emitted, by the laser marker 50, perpendicularly to the first laser beam 101 in the vehicle length direction is emitted perpendicularly to the reflection surface 41 of the second reflector 40 disposed in front of or behind the motorcycle 1. A detection wave is emitted from the radar device 22 provided in the motorcycle to the second reflector 40, and the transmission direction of the detection wave is calibrated based on a detection result of a reflected wave.

Accordingly, the second reflector 40 can be disposed perpendicularly to the vehicle length direction of the motorcycle 1 by a simple operation. Therefore, it is possible to reduce time and effort for calibrating the radar device 22.

In the detection device calibration method according to the present embodiment, the first reflector 30 is attached to the attachment surface 12d, which is perpendicular to the vehicle width direction, among the side surfaces of the motorcycle 1.

Accordingly, the reflection surface 30a of the first reflector 30 and the attachment surface 12d of the motorcycle 1 are parallel to each other. Therefore, the direction of the reflection surface 30a can be made perpendicular to the vehicle width direction by utilizing the direction of the attachment surface 12d of the motorcycle 1.

In the detection device calibration method according to the present embodiment, the first reflector 30 includes the reflection surface 30a and the back surface 30b on a back side of the reflection surface 30a. The reflection surface 30a and the back surface 30b are parallel to each other. The first reflector 30 is attached to the motorcycle 1 such that the back surface 30b of the first reflector 30 is in contact with the attachment surface 12d of the motorcycle 1.

Accordingly, since the first reflector 30 is directly attached to the motorcycle 1, it is possible to reduce time and effort of the operator.

In the detection device calibration method according to the present embodiment, the steered wheel of the motorcycle 1 is the front wheel 11. The first reflector 30 is attached to the rear wheel 12 or a member supported by the rear wheel 12.

Since the wheel is a component directly related to traveling, the direction accuracy of the wheel with respect to the motorcycle 1 is high, and thus the wheel is appropriate as an attachment destination of the first reflector 30. Further, since the rear wheel 12 is not a steered wheel, the direction of the rear wheel 12 does not change, and thus the rear wheel 12 is more appropriate as an attachment destination of the first reflector 30.

In the detection device calibration method according to the present embodiment, the first reflector 30 is attached to the rear brake disc 12c of the rear wheel 12.

The rear brake disc 12c is supported by the rear wheel 12, has a flat surface facing the vehicle width direction, and has high flatness, and thus is appropriate as an attachment destination of the first reflector 30.

In the detection device calibration method according to the present embodiment, the motorcycle 1 includes the drive chain 14 that transmits a driving force for driving the rear wheel 12. The drive chain 14 is located on the one side in the vehicle width direction with respect to the rear brake disc 12c. The first reflector 30 is attached to the surface on the other side of the rear brake disc 12c in the vehicle width direction.

Since the first laser beam 101 does not interfere with the drive chain 14, the direction of the laser marker 50 can be easily adjusted.

In the detection device calibration method according to the present embodiment, the first reflector 30 is a member in which the reflection member 31 including the reflection surface 30a and the magnet 32 are coupled with each other. Here, the member may be formed by bonding or engaging the reflection member 31 and the magnet 32 with each other, for example. The first reflector 30 is attached to the motorcycle 1 by the magnetic force of the magnet 32.

Accordingly, the first reflector 30 can be easily attached and detached.

Although the preferred embodiment of the present application has been described above, the above configuration may be modified as follows, for example.

In the above embodiment, the radar device 22 has been described as an example of the detection device. Alternatively, the detection device calibration method according to the present embodiment can also be applied to a detection device other than the radar device 22, for example, a sonar, a camera, or the like.

In the above embodiment, the motorcycle 1 has been described as an example of the vehicle. Alternatively, the detection device calibration method according to the present embodiment can also be applied to a vehicle other than the motorcycle 1, which may be a vehicle including two front wheels and one rear wheel, a vehicle including one front wheel and two rear wheels, or a vehicle including two front wheels and two rear wheels, for example.

What is claimed is:

1. A detection device calibration method comprising:
   attaching a first reflector to at least one surface of side surfaces of a vehicle such that a reflection surface of the first reflector is perpendicular to a vehicle width direction;
   adjusting a direction of a laser marker such that a first laser beam emitted by the laser marker is emitted perpendicularly to the reflection surface of the first reflector;
   adjusting a direction of a second reflector disposed in front of or behind the vehicle such that a second laser beam emitted by the laser marker is emitted perpendicularly to a reflection surface of the second reflector, the second laser beam being emitted perpendicularly to the first laser beam in a vehicle length direction;
   emitting a detection wave from a detection device provided in the vehicle to the second reflector; and
   calibrating a transmission direction of the detection wave based on a detection result of a reflected wave.

2. The detection device calibration method according to claim 1, wherein
   the attaching of the first reflector includes attaching the first reflector to an attachment surface perpendicular to the vehicle width direction among the side surfaces of the vehicle.

3. The detection device calibration method according to claim 2, wherein
   the first reflector includes the reflection surface and a back surface on a back side of the reflection surface,
   the reflection surface and the back surface are parallel to each other, and the attaching of the first reflector includes attaching the first reflector to the vehicle so as to bring the back surface of the first reflector into contact with the attachment surface of the vehicle.

4. The detection device calibration method according to claim 1, wherein the vehicle includes; a front wheel serving as a steered wheel; and a rear wheel, and the attaching of the first reflector includes attaching the first reflector to the rear wheel or a member supported on the rear wheel.

5. The detection device calibration method according to claim 4, wherein the attaching of the first reflector includes attaching the first reflector to a rear brake disc of the rear wheel.

6. The detection device calibration method according to claim 5, wherein the vehicle includes a drive chain configured to transmit a driving force for driving the rear wheel, the drive chain is located on one side in the vehicle width direction with respect to the rear brake disc, and the attaching of the first reflector includes attaching the first reflector to a surface on the other side of the rear brake disc in the vehicle width direction.

7. The detection device calibration method according to claim 1, wherein the first reflector includes a member in which a reflection member having the reflection surface and a magnet are coupled with each other, and the attaching of the first reflector includes attaching the first reflector to the vehicle by a magnetic force of the magnet.

8. The detection device calibration method according to claim 1, wherein the detection device is a radar device.

\* \* \* \* \*